(12) United States Patent
Perugini et al.

(10) Patent No.: US 11,928,546 B2
(45) Date of Patent: Mar. 12, 2024

(54) DUAL ILLUMINATOR AS FIELD OF VIEW IDENTIFICATION AND AIMING

(71) Applicant: Datalogic IP Tech, S.r.l., Bologna (IT)

(72) Inventors: Luca Perugini, Bologna (IT); Kurt Vonmetz, Bologna (IT); Davide Bruni, Bologna (IT)

(73) Assignee: Datalogic IP Tech, S.r.l., Bologna (IT)

(*) Notice: Subject to any disclaimer, the term of this patent is extended or adjusted under 35 U.S.C. 154(b) by 0 days.

(21) Appl. No.: 17/534,797

(22) Filed: Nov. 24, 2021

(65) Prior Publication Data
US 2022/0207253 A1 Jun. 30, 2022

Related U.S. Application Data (60) Provisional application No. 63/131,946, filed on Dec. 30, 2020.

(51) Int. Cl.
G06K 7/10 (2006.01)
G06K 7/14 (2006.01)

(52) U.S. Cl.
CPC ...... G06K 7/10732 (2013.01); G06K 7/10811 (2013.01); G06K 7/10881 (2013.01); G06K 7/1452 (2013.01)

(58) Field of Classification Search
CPC ................................................. G06K 7/10732
USPC ........................................................ 235/454
See application file for complete search history.

(56) References Cited

U.S. PATENT DOCUMENTS

| | | | |
|---|---|---|---|
| 7,178,733 B2 | 2/2007 | Zhu et al. | |
| 7,878,406 B2 | 2/2011 | Pankow | |
| 7,988,053 B2 | 8/2011 | Kotlarsky et al. | |
| 8,201,740 B2 | 6/2012 | Vinogradov et al. | |
| 8,657,196 B2 | 2/2014 | Olmstead | |
| 8,899,484 B2 | 12/2014 | Trajkovic et al. | |
| 8,910,872 B2 | 12/2014 | Barkan et al. | |
| 9,185,306 B1 | 11/2015 | Tan et al. | |
| 9,594,936 B1 | 3/2017 | Gao | |
| 9,800,749 B1 | 10/2017 | Tan et al. | |
| 10,210,367 B1 | 2/2019 | Quattrini et al. | |
| 10,210,369 B2 | 2/2019 | Negro | |
| 10,489,623 B1 | 11/2019 | Handshaw et al. | |
| 10,534,944 B1 * | 1/2020 | Brock ................ G06K 7/10881 |
| 11,151,344 B2 | 10/2021 | Barkan et al. | |

(Continued)

OTHER PUBLICATIONS

U.S. Appl. No. 17/118,374, filed Dec. 10, 2020, entitled "Aimer Localization and Triangulation in Multi-Sensor Scanner," 49 pages.

(Continued)

*Primary Examiner* — Rafferty D Kelly
(74) *Attorney, Agent, or Firm* — Cozen O'Connor (57) ABSTRACT

A code reader comprises a first imager and a second imager configured to capture an image with different field of views, a first illuminator and a second illuminator configured to project a different illumination pattern, and a processor operably coupled to the imagers and the illuminators. The processor configured to activate the first imager and the first illuminator as a receiver pair responsive to detecting a first condition, activate the second imager and the second illuminator as a receiver pair responsive to detecting a second condition, and decode an optical code using an image captured by the selected receiver pair.

20 Claims, 4 Drawing Sheets

(56) References Cited

U.S. PATENT DOCUMENTS

| | | | |
|---|---|---|---|
| 2005/0199719 A1* | 9/2005 | Hepworth | G06K 7/10732 |
| | | | 235/454 |
| 2009/0026267 A1* | 1/2009 | Wang | G06K 7/1465 |
| | | | 235/440 |
| 2012/0181338 A1 | 7/2012 | Gao | |
| 2013/0126618 A1 | 5/2013 | Gao | |
| 2016/0364936 A1 | 12/2016 | Gao | |
| 2017/0289421 A1 | 10/2017 | Tan et al. | |
| 2018/0101708 A1 | 4/2018 | Gao | |
| 2018/0307880 A1 | 10/2018 | Gao | |
| 2021/0256285 A1 | 8/2021 | Canini et al. | |
| 2022/0232138 A1 | 7/2022 | Gao et al. | |

OTHER PUBLICATIONS

Extended European Search Report, dated May 16, 2022, for European Application No. 21215502.2, 7 pages.

* cited by examiner

FIG. 7

DUAL ILLUMINATOR AS FIELD OF VIEW IDENTIFICATION AND AIMING

CROSS REFERENCE TO RELATED APPLICATION

This application claims the benefit of U.S. Provisional Application No. 63/131,946, filed Dec. 30, 2020, and entitled "DUAL ILLUMINATOR AS FIELD OF VIEW IDENTIFICATION AND AIMING," the disclosure of which is incorporated by reference herein in its entirety.

TECHNICAL FIELD

The present disclosure relates generally to scanners or code readers, and more particularly, to coder readers including image-based optical scanning system having multiple image-capture devices and corresponding illuminators.

BACKGROUND

Image-based optical scanning includes a diverse range of applications such as reading of machine-readable symbols (e.g., one-dimensional symbols, 2-dimensional symbols), optical character recognition, object detection or recognition, and the like. In general, such systems work by capturing a digital image of a subject using a camera with an image sensor, and computationally processing the captured image to autonomously detect, recognize, or read the subject. The output generally includes data represented by, or describing, the subject. For example, in the case of reading a 1-D or 2-D symbol, the output may be a number or an alphanumeric string represented by that symbol. Likewise, in the case of recognizing a printed or hand-written character or set of characters, the output may be a textual representation of that character or set; and in the case of object recognition, the output may be a classification result (e.g., a label) describing the object.

In situations where the capture of the image is complicated by one or more conditions or circumstances, such as varying distance between the camera and the subject, low light, reflections, backlighting, unsteady positioning of the camera, or the like, the quality of the captured image may be insufficient for the subsequent processing of the image to be effective. Optical scanners have been proposed that use multiple cameras to capture multiple images of the subject from multiple fields of view. In the case of specular reflections interfering with a first image of the subject as captured by one of the cameras, the second image captured by the second camera may be more readable. In situations where one part of the subject is unreadable in the first image, and another part of the subject is unreadable in the second image, an image processing technique has been proposed that combines the two images to produce a combined, readable, image of the subject.

Conventional code readers including those with multiple cameras typically include a single illuminator with lens that shapes the illumination pattern in a wide rectangular zone to cover a large field of view (FOV) receiver and a superimposed narrow circular zone to cover the narrow FOV. The single illuminator may remain the same but provides a coarse identification of different FOVs without giving an indication of which receiver camera is used. Another conventional method includes modifying the pattern of a laser aimer in order to create two lateral lines that help to identify the narrow FOV of one of the receivers.

BRIEF SUMMARY

A code reader comprises a first imager and a second imager configured to capture an image with different field of views, a first illuminator and a second illuminator configured to project a different illumination pattern, and a processor operably coupled to the imagers and the illuminators. The processor configured to activate the first imager and the first illuminator as a receiver pair responsive to detecting a first condition, activate the second imager and the second illuminator as a receiver pair responsive to detecting a second condition, and decode an optical code using an image captured by the selected receiver pair.

A method comprises activating a first imager and a first illuminator as a receiver pair of an optical code reader responsive to detecting a first condition, activating a second imager and a second illuminator as a receiver pair of the optical code reader responsive to detecting a second condition, and decoding an optical code using an image captured by the selected receiver pair. The first imager and the second imager have different fields of view, and the first illuminator and the second illuminator project a different pattern substantially matching the corresponding field of view for its receiver pair.

DETAILED DESCRIPTION

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

One or more implementations of the present disclosure are directed to optical code (e.g., barcode) readers (also referred to as "scanners"). Such scanners may include handheld scanners, fixed scanners (e.g., fixed retail scanners), presentation scanners, mobile computers, point of sale systems, vision systems (e.g., automated guided vehicles (AGVs), robotics, automated driving, and machine-vision (MV) systems) and/or other systems and devices in which the functionality of an optical code reader is desirable. The scanner may be configured as a stand-alone imager module (sometimes referred to as a "scan engine") that may be incorporated into a larger device or system. The scanner includes an optical sensor (e.g., imager) to capture an indicia that encodes data and a processor to interpret the indicia to decode the data. Illumination sources (e.g.; red, white, etc.) may also be included to assist with image capture. The optical sensor may be a monochrome imager or a color imager depending on the particular application or desired capabilities of the scanner. The scanner may be configured to read and decode optical codes, such as 1D and 2D codes as well as high density codes, Dot codes, watermarking (e.g., Digimarc), optical character recognition (OCR), and other visual code and image recognition techniques for identifying an object. The embodiments described herein are often in the context of visual symbol-reading, but it is contemplated that principles of the present technologies relating to localization or ranging are likewise applicable in a multitude of other areas and within the scope of the disclosure. In some embodiments, the scanner may include communication modules configured for communication via communication technologies and protocols known by those skilled in the art.

In a multi-imager barcode scanner (e.g., dual imager), the inventors have appreciated the importance of providing the user an easy way to understand how to correctly aim and frame the optical code inside the active receiver's field of view (FOV). Embodiments of the disclosure may include an optical code reader including a plurality of imagers corresponding to a plurality of receiving optics and a plurality of illuminator sources. The receiving optics may have different fields of view (FOV). For example, a first field of view may be tailored for close distances (i.e., near field FOV) and a second field of view may be tailored for far distances (i.e., far field FOV). Each illuminator source may also correspond to a different set of imager/receiving optics (sometimes referred to as a "receiver") with their respective FOV. Each illuminator may be configured to project a pattern identifying the related FOV of its corresponding receiver. For example, the pattern projected by the illuminator may be a rectangular shape which at least substantially matches the FOV of the related receiver. If the FOV of a receiver changes, the shape of the corresponding illuminator pattern may also change accordingly. In operation, the illuminators may be activated at different times (i.e., not simultaneously). The scan engine may be configured to select which illuminator to activate responsive to which imager is selected as the active receiver. This decision may be based on parameters such as target distance, code size, code resolution. When the scanner chooses a receiver imager, the scanner may also activate the corresponding illuminator that projects a different illumination pattern. As a result, the scanner may identify to the user what is the current available FOV, which may be an improvement over conventional systems in which the user has no direct way to see which imager is selected at a given moment.

Different configurations and details regarding the construction and components of a scanner are contemplated, as well as different environments for implementation according to embodiments of the disclosure. For example, additional features and configurations of devices are described in the following patents and patent applications: U.S. Patent Application Publication No. 2021/0256285, filed Feb. 18, 2020, and entitled "VIRTUAL-FRAME PREPROCESSING FOR OPTICAL SCANNING"; U.S. patent application Ser. No. 17/118,374, filed Dec. 10, 2020, and entitled "AIMER LOCALIZATION AND TRIANGULATION IN MULTI-SENSOR SCANNER"; and U.S. Pat. No. 10,210,367, issued Feb. 19, 2019, entitled "OPTICAL ASSEMBLY FOR SCANNING ENGINE," the disclosure of each of which is incorporated by reference in their entirety.

Figure 1:
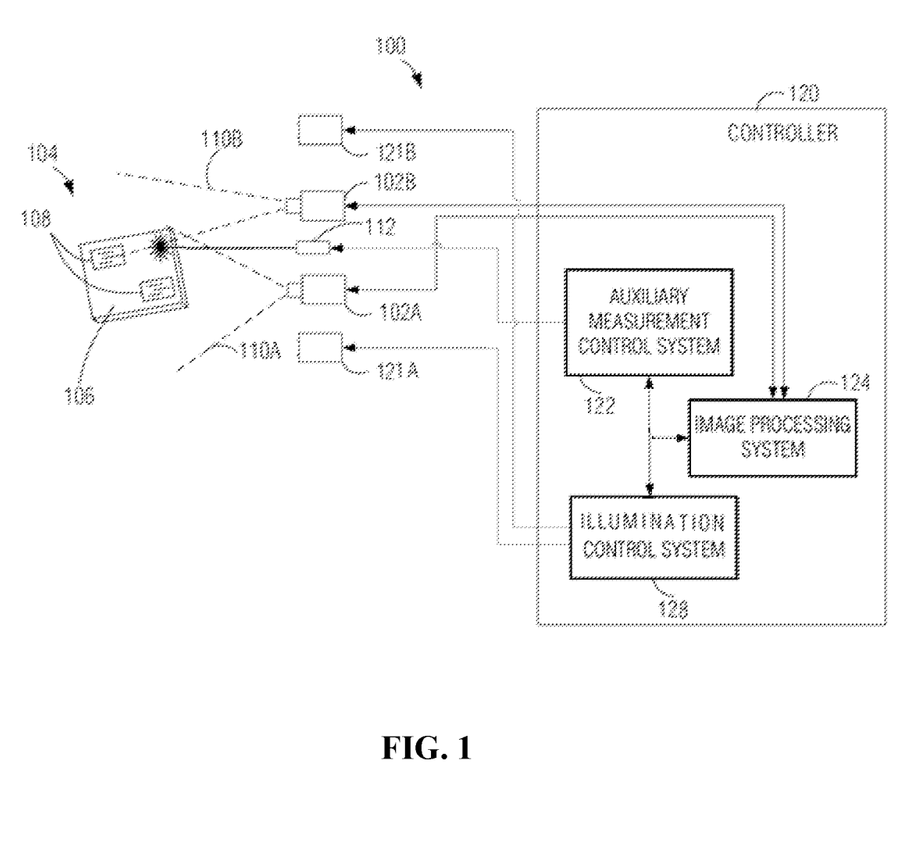
FIG. 1 is a simplified block diagram illustrating an implementation of a scanning system according to at least one example embodiment.

FIG. 1 is a simplified block diagram illustrating an implementation of a scanning system 100 according to an embodiment of the disclosure. As discussed further below, the scanning system 100 may be employed to capture multiple images of a subject, such as a machine-readable symbol or set of symbols 108 (e.g., barcode, 2D barcode, printed characters, graphics, text, image-encoded information such as a digital watermark, etc.) or a machine-detectable or -recognizable object 106. Scanning system 100 may capture one or more images and read, recognize, detect, or perform other automated analytical processing of the subject. For the sake of brevity, operations such as these will be referred to in the present context as "reading."

Scanning system 100 includes multiple image-capture devices, 102A, 102B (collectively, image-capture devices 102) and corresponding illumination sources 121A, 121B (collectively, illumination sources 121; also referred to herein as "illuminators"). Although two image capture devices 102A, 102B are shown, in some embodiments additional image capture devices 102 may be present. Likewise, although two illuminations sources 121A, 121B are shown, in some embodiments additional illumination sources 121 may be present.

Each image-capture device 102 may include an image sensor that is constructed and operative to produce signals representing images or video frames. In the present context, the terms "image" and "video frame" may be used interchangeably to refer to a fixed image or portion thereof, with any distinctions intended between the two data types specifically called out if pertinent. Each image-capture device may be assembled together with optical components, such as an objective, microlens array, or the like. In other examples, more than one individual image-capture device may share a common optical system. Image-capture devices 102 may be constructed using any suitable technology, whether known or arising in the future. Without limitation, some examples include complementary metal-oxide semiconductor (CMOS)-based sensors, charge-coupled device (CCD)- based sensors, sensors optimized for the visible spectrum, sensors optimized for infrared or near-infrared frequencies, high-dynamic-range (HDR) sensors, monochrome sensors, color sensors, Quanta Image Sensors, Hyperspectral sensors, Polarized sensors, Image sensors embedding AI capabilities, or the like. In related implementations, the set of image-capture devices 102 that are employed in scanning system 100 include sensors of diverse types, such as a grouping that includes conventional image sensor and an HDR image sensor, for example.

As shown in the example of FIG. 1, image-capture devices 102A-102B have respective fields of view 110A-110B. In related examples, the various image-capture devices 102 have different optical characteristics. For instance, image-capture device 102A may be a near-field camera, whereas image-capture device 102B may be a far-field camera. As another useful feature in some embodiments, the image-capture devices 102 are situated in a specific spaced relationship with one another.

Image-capture devices 102 are communicatively coupled to image processing system 120, which is configured to receive the captured images and perform the processing operations for reading of the subject. In some embodiments, as described in detail below, image processing system 120 employs a multi-phase operational regime to quickly and efficiently determine one or more operational parameters for capturing the images taking into account the prevailing conditions surrounding the subject, the environment, and usage of scanning system 100. According to some examples, the operational parameters that may be determined include:
  selection of one of the image sensor/camera which is deemed optimal;
  exposure setting for the image capture;
  gain control for the image sensor;
  focus configuration; or
  illumination settings.

Scanning system 100 may be configured to determine ranging to the target surface. For example, the scanning system 100 may further include an aimer projector 112 (e.g., a laser emitter). The aimer projector 112 may be situated at a fixed position relative to image-capture devices 102A-102B (or 102N). In some embodiments, the positional offset between each image-capture device 102 and the aimer projector 112 may facilitate determination of ranging to the target surface using a triangulation technique.

Image-capture devices 102, illumination sources 121, and aimer projector 112 are interfaced with controller 120, which includes auxiliary measurement control system circuitry 122, image processing system circuitry 124, and illumination control circuitry 128. In some embodiments, each image-capture device 102, illumination sources 121, and aimer projector 112 may be communicatively coupled to controller 120 through a wired or wireless medium. In a related embodiment, a network (e.g., LAN, WAN, PAN, Internet) may facilitate the communicative coupling. In some embodiments, the image-capture device 102 may be connected directly to controller 120 through a suitable local interface (e.g., I²C, USB, SPI, UART, I³C) or may be integrated with controller 120 and interconnected using an internal interconnect such as a suitable variant of a peripheral component interconnect (PCI), serial AT Attachment (SATA), mobile industry processor interface (MIPI), or other interconnects known by those skilled in the art.

Auxiliary measurement control system 122 is operative in concert with image processing system 124 to coordinate the operation of aimer projector 112 and image-capture devices 102A-102B to measure the ranging to a target surface of subject 104. Image-capture devices 102 are communicatively coupled to image processing system 124, which is configured to receive the captured images and perform the processing operations for determining the ranging, setting operational parameters to facilitate image capture of subject 104 based on the ranging, and capture the images of subject 104 to perform reading of subject 104. Illumination control system 128 is operated in concert with the image processing system 124 to control operation of the illumination sources 121 as will be described more fully below.

Figure 2:
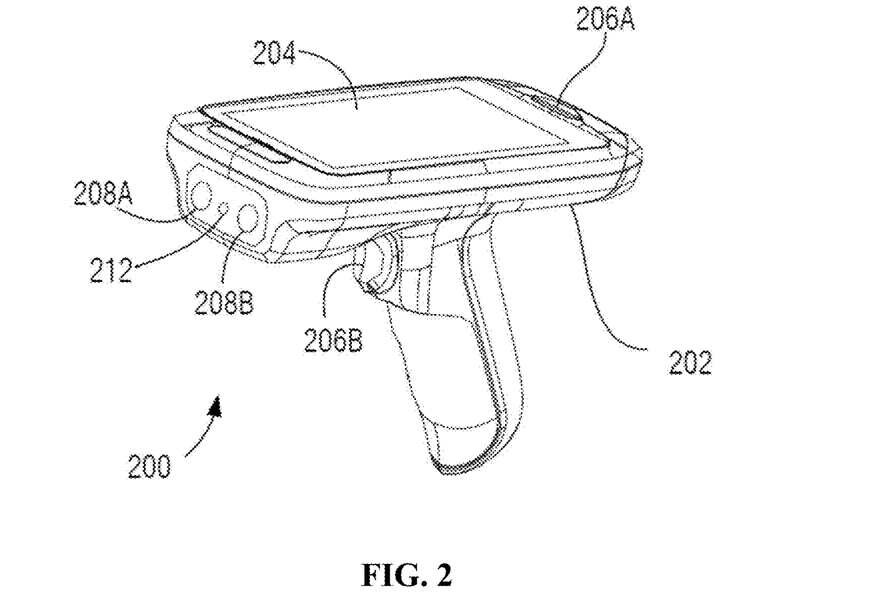
FIG. 2 is a diagram illustrating handheld reader as one example implementation of a scanning system.

FIG. 2 is a diagram illustrating handheld reader 200 as one example implementation of scanning system 100. Handheld reader 200 includes housing 202, display 204, and pushbutton controls 206A and 206B. As depicted, handheld reader 200 also includes forward-facing cameras 208A and 208B positioned in a spaced-apart relationship to have partially overlapping fields of view. In some examples, a forward-facing laser emitter 212 is provided to facilitate ranging to the subject. Laser emitter 212 may work in concert with one or both of the cameras 208A, 208B according to a triangulation technique in which a position of the laser spot within the field of view of one or both of the cameras is indicative of the distance to the subject.

In other examples, a laser emitter (not shown) may work with a detector (not shown) to provide time of flight (TOF) distance measurements. The ranging measurements may be used as input (among other inputs) to determine operational parameters such as selection of image sensor for subsequent information processing, focus setting, illumination power, sensor gain, exposure control, frame rate, and other settings.

In related embodiments, handheld reader 200 includes other types of sensors, such as an accelerometer (not shown) that can measure the motion of handheld reader 200. Motion data may be indicative of the user's scanning technique, such as the user's steadiness (or lack thereof) of holding handheld reader 200. The motion data may likewise be used as an input (among other inputs) to determine the operational parameters.

According to other embodiments, a reader may be mounted to a stationary or mobile structure. Examples of mounting locations for various scanning applications include vehicles, doorways, ramps, conveyors, buildings, robots, or the like. In mounted implementations, the cameras may have their own respective housings, which may be separate from the image processing system hardware.

Figure 3:
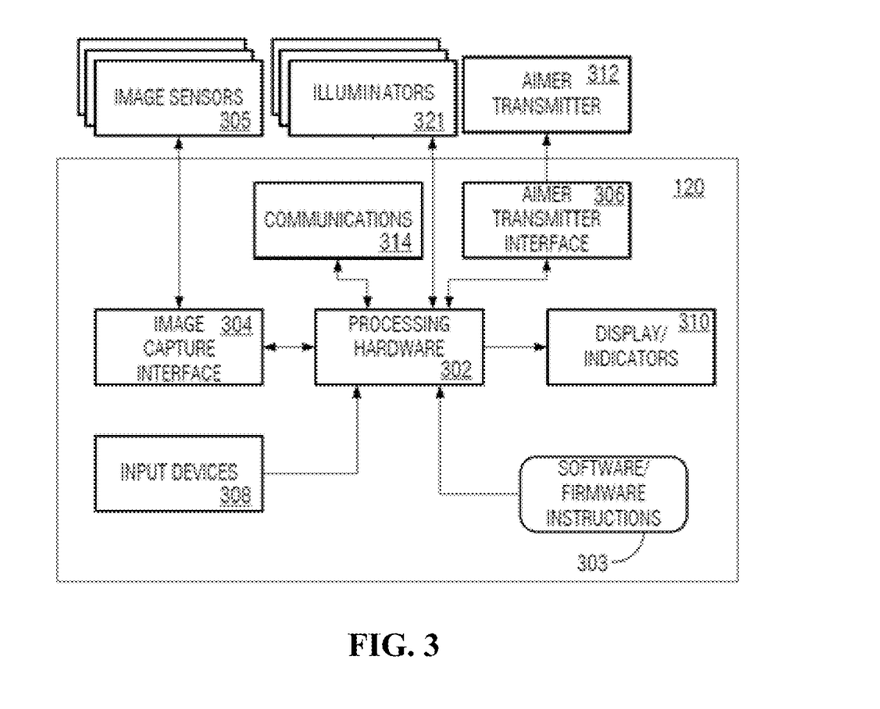
FIG. 3 is a high-level block diagram illustrating an example system architecture of a scanning system, with various components of an image processing system shown.

FIG. 3 is a high-level block diagram illustrating an example system architecture of scanning system 100, with various components of controller 120 shown. Controller 120 includes processing hardware 302 operatively coupled to image capture interface 304, input devices 308, display or indicators 310, communications circuitry 314, and aimer transmitter interface 306. Processing hardware 302 includes one or more processor circuits that execute software or firmware instructions 303, with the latter being stored in a non-transitory machine-readable medium such as a read-only memory, flash memory, random-access memory, or the like.

Controller 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), Complex Programmable Logic Device (CPLD), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Image capture interface 304 includes circuitry facilitating the exchange of data between processing hardware 302 and image sensors 305. In some examples, image capture interface 304 includes data buffers, video decoders, video encoders, address and data bus interfaces, serial data receiver/transmitter circuitry, analog-to-digital (A/D) converter circuitry, and the like. The data communications portions of image capture interface 304 may facilitate wired or wireless communication. Image capture interface 304 is operative to pass video frames from their original format as output by each of image sensors 305 to processing hardware 302 in a suitable data format to be read by processing hardware 302. Image capture interface 304 and processing hardware 302 may work in concert to implement image processing system 124 (FIG. 1).

In a related example, image capture interface 304 may additionally be configured to pass information from processing hardware 302 to one or more of image sensors 305. This upstream information may include configuration commands such as sensor gain settings, frame rate, exposure control, activation/deactivation commands, etc.

In some embodiments, image capture interface 304 may be integrated as part of a digital signal processor (DSP) device or microcontroller device. In other embodiments, image capture interface 304 may be integrated as part of one or more image sensors 305.

Aimer transmitter interface 306 includes circuitry to control the operation of aimer projector 312. Aimer interface 306 may include current regulator circuitry, switching circuitry, or the like. Aimer transmitter 312 may include a solid-state laser emitter having a wavelength that is within the light-detection range of image sensors 305. Aimer transmitter interface 306, and processing hardware 302 may work in concert to implement auxiliary measurement control system 122 (FIG. 1).

Input devices 308 include user-operable controls, such as pushbuttons, keypad, touchscreen, and the like, as well as additional sensors, such as a ranging sensor, motion sensor, accelerometer, etc. Display or indicators 310 include devices such as a liquid-crystal display (LCD), LED indicators, speaker or buzzer, and other suitable output devices.

Communications circuitry 314 includes wired or wireless communications facilities that provide input and output to and from processing hardware 302. Communication circuitry may include one or more of the following types of communication circuits: universal serial bus (USB), CAN, I$^2$C, SPI, UART, I$^3$C, Ethernet, personal-area network such as Bluetooth according to an IEEE 802.15 standard, Wi-Fi according to an IEEE 802.11 standard, or the like.

Figure 4:
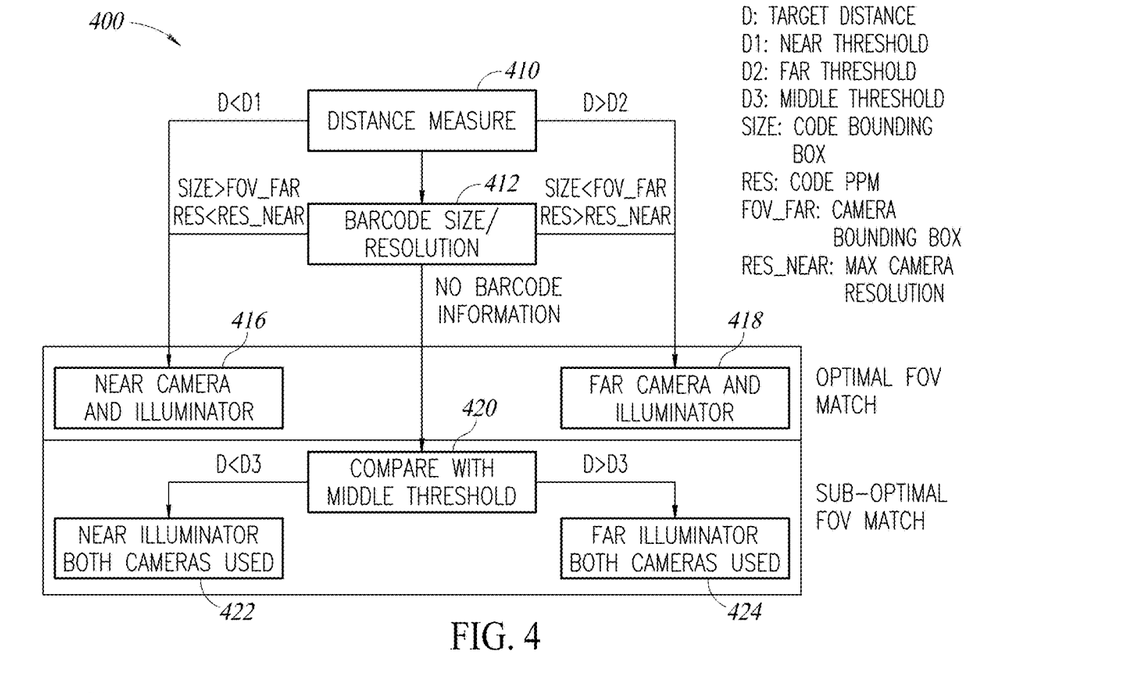
FIG. 4 is a simplified block diagram showing a method for illuminating an object in coordination with imagers of an optical code reader according to an embodiment of the disclosure.

FIG. 4 is a simplified block diagram 400 showing a method for illuminating an object in coordination with imagers of an optical code reader according to an embodiment of the disclosure. In particular, the method may determine which imager is selected along with the desired illumination source.

At operation 410, a distance measure of the object from the scanner may be determined by the aimer (e.g., TOF sensor, laser triangulation, passive focus run with best contrast evaluation, etc.). If the determined target distance (D) is less than a near threshold (D1), then the near field camera may have enough resolution to read an optical code. As a result, the near field camera and corresponding illuminator may be selected for capturing the image at operation 416. If the determined target distance (D) is greater than a far threshold (D2), then the far field camera may have enough resolution to read an optical code. As a result, the far field camera and corresponding illuminator may be selected for capturing the image at operation 418. In this way, the target distance is used as coarse grain information to select the camera when no barcode is present in the current scene or additional information on barcode is not available for any reason.

If the target distance (D) is between these two thresholds (D1<D<D2), the target distance alone may not be enough to determine the best receiver and illuminator pair. At operation 412, code size and resolution may be determined for one or more images of the system. For example, one or more images may be captured by both cameras that are sent to a decoder that applies a decoding library to attempt a decode. During this decode process, the code size (e.g., via dimensions of a code bounding box) and resolution (determined by pixel per module (PPM) calculation) may be determined for each image as well as the absolute position of the code within the images. In some embodiments, the code information (e.g., code size, resolution, position, etc.) may be determined prior to the actual decoding of the code. This code information determined prior to actual decoding of the code may be an approximation of the code information that may be determined after a decode operation.

The code size (e.g., code bounding box) as determined from the image captured by the far imager may be compared to the far imager FOV (FOV FAR), and the resolution (Res; e.g., code PPM) of the optical code as determined from the image captured by the near imager may be compared to a predetermined max resolution of the near field imager (RES NEAR) (e.g., determined code PPM compared to max code PPM). The predetermined max resolution may be set in terms of a threshold for code PPM to be able to adequately decode the code. If the determined code size from the image captured by the far field imager is greater than the FOV FAR and the determined resolution (Res) is less than the max resolution of the near field imager (RES NEAR), then the near field imager and corresponding illuminator may be selected at operation 416. If the code size is less than the FOV FAR and the determined resolution (Res) is greater than the max resolution of the near field imager (RES NEAR), then the far field imager and corresponding illuminator may be selected at operation 418.

If additional information on code size and/or resolution is not available, the illuminator may be selected based on a third distance threshold (D3) between the other two thresholds at operation 420 and frames from both imagers are used to try to decode at operations 422, 424. At operation 422, the near illuminator may be selected for attempted decoding for both imagers when target distance (D) is less than the third threshold (D3). At operation 424, the far illuminator may be selected for attempted decoding for both imagers when target distance (D) is greater than the third threshold (D3). Decoding is still achieved, with just a small performance degradation due to checking both imagers, but in this case the illuminator may not always reflect the correct FOV depending on code resolution. A high-resolution code at D1<D<D3 could be decoded with far imager but near illuminator during operation 422, while a low-resolution code at D3<D<D2 may be decoded with near camera but far illuminator 424. In these cases, the best indication of available FOV presented to the user may not be guaranteed.

In some embodiments (e.g., at operations 416, 418), the selection of the imager and the illumination source to be activated may be based, in part, on distance to the target information without exploiting information about the optical code (e.g., barcode). In some embodiments (e.g., at operations 420, 422, 424), the selection of the imager and the illumination source to be activated may be based, in part, on exploiting information (e.g., size, resolution) about the optical code (e.g., barcode). In some embodiments (e.g., operations 412-424), the selection of the imager and the illumination source to be activated may be based, in part, on a combination of distance to the target information and the information about the optical code (e.g., barcode). Other criteria for selection of the imager and illumination source are also contemplated and within the scope of the disclosure.

Figure 5:
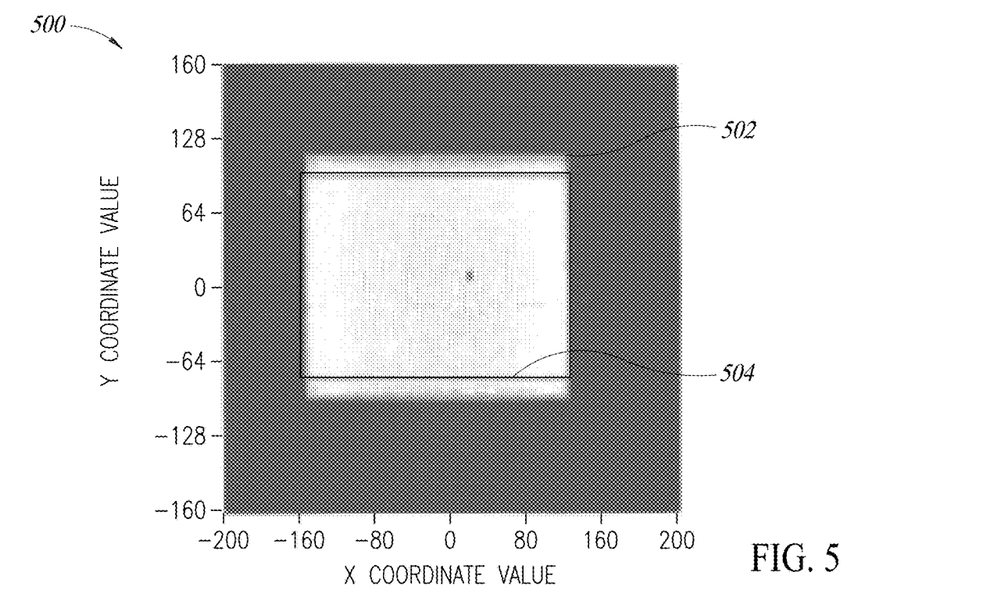
FIG. 5 shows example of an illuminator shape at a specific distance according to an embodiment of the disclosure.

In FIG. 5, the illuminator shape is shown in by the first region 502 (inner shaded region) with respect to the box 504 representing the receiving FOV at a specific distance. As discussed above, two separate illuminators may be present to match their corresponding receiving optic's FOV. The illuminators may have a rectangular projection on the target that substantially matches the dimension of corresponding receiver FOV. The illuminators are actively aligned to compensate mounting tolerances and improve the matching with the receiver optics. In one embodiment, the reader may include by two receivers: a far field imager with a first angle of view (e.g., 12 degrees) and a near field imager with a second angle of view (e.g., 35 degrees). The reader also includes two illuminators that closely match the FOV of the receivers and are aligned with them. Each illuminator has a rectangular shape with sharp edges. The illuminators are never active at the same time in order to reduce power consumption and to avoid irregular illumination intensity in the acquired images and they follow the currently selected receiver instead. The reader may select which one of the receivers is the most appropriate to acquire images of the target barcode base on the following information: target distance, code size, and code resolution.

Figure 6:
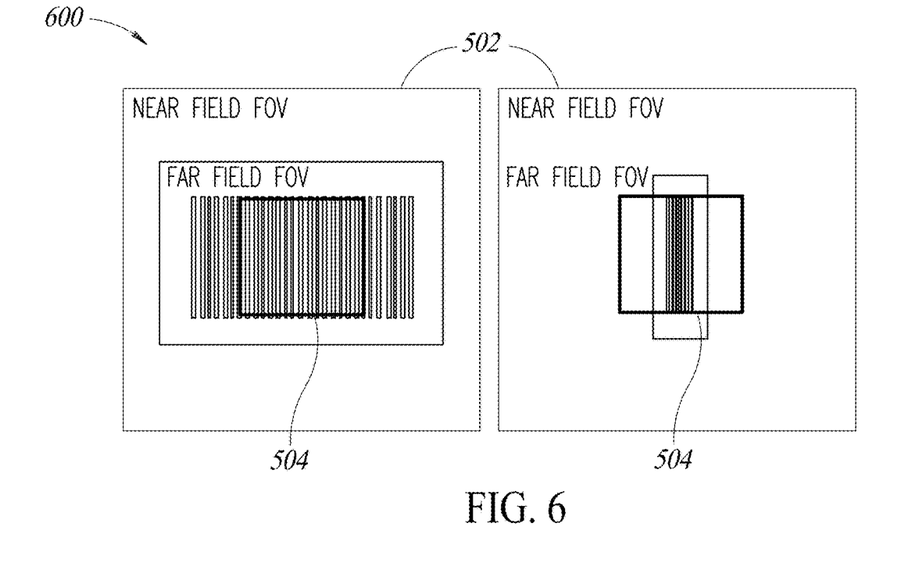
FIG. 6 shows examples of an illuminator switching at the same target distance according to an embodiment of the disclosure.
Figure 7:
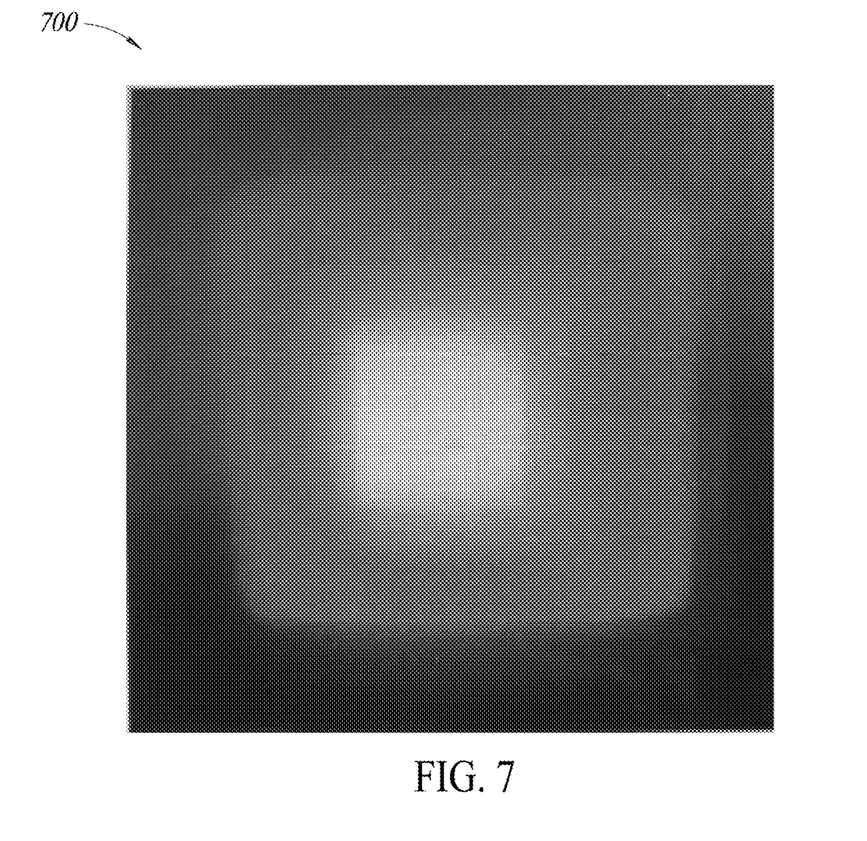
FIG. 7 shows an example of a switching operation of the illuminators according to an embodiment of the disclosure.

In FIG. 6, an example of illuminator switching at the same target distance. The near field of view is indicated by box 502 and the far field of view is indicated by box 504. In the left imager, the near FOV imager and illuminator are selected because the barcode is too wide to fit in the far FOV 504. In the image on the right, if a high resolution barcode is presented, the far field imager is selected because the barcode is below the near field resolution limit. Without switching the illuminator system, the user would have no clear indication regarding the FOV that is currently available to read the code. The switch operation used to guide the user can be performed in different ways:

a. A hysteresis is needed to avoid illuminator flickering. Even during camera selection and with fast changing scene, illuminators must be kept stable for a minimum number of frames.

b. In cases where fast switching is needed, it is enough to switch active illuminator in the following frame.

c. Where some switch delay is acceptable, the illuminator switch can be performed by gradually fading out one illuminator while the other is fading in. This can be achieved gradually mixing active illuminators with a changing duty cycle. This is shown in FIG. 7

Additional non-limiting embodiments include:

Embodiment 1. A code reader, comprising: a first imager and a second imager configured to capture an image with different field of views; a first illuminator and a second illuminator configured to project a different illumination pattern; a processor operably coupled to the imagers and the illuminators, the processor configured to: activate the first imager and the first illuminator as a receiver pair responsive to detecting a first condition; activate the second imager and the second illuminator as a receiver pair responsive to detecting a second condition; and decode an optical code using an image captured by the selected receiver pair.

Embodiment 2. The code reader of embodiment 1, wherein the first imager has a near FOV and the second imager has a far FOV.

Embodiment 3. The code reader of embodiment 1 or embodiment 2, wherein the first illuminator and the second illuminator are not simultaneously activated.

Embodiment 4. The code reader of embodiment 2 or embodiment 2, wherein each illuminator pattern projects a rectangular shape that substantially matches the FOV of its corresponding imager.

Embodiment 5. The code reader of any of embodiments 1 through 4, wherein the first and second conditions are based, at least in part, on a determination of code size of an optical code on an object within its field of views.

Embodiment 6. The code reader of any of embodiments 1 through 5, wherein the first and second conditions are based, at least in part, on a determination of a target distance of an object within its field of views.

Embodiment 7. The code reader of embodiment 6, wherein the target distance is determined based on at least one of a time of flight measurement, laser triangulation, or passive focus run with best contrast evaluation.

Embodiment 8. The code reader of any of embodiments 1 through 7, wherein the first and second conditions are based, at least in part, on a determination of a code resolution of an optical code of an object within its field of views.

Embodiment 9. The code reader of any of embodiments 1 through 8, wherein the code reader is incorporated within one of a handheld scanner, a presentation scanner, a scan engine, a fixed scanner, a top down reader associated with a fixed scanner, a mobile computer, a point of sale system, a vision system, a robotic system, an automated driving system, or a machine vision system.

Embodiment 10. The code reader of any of embodiments 1 through 9, wherein the processor is configured to perform a switch operation from activating the first illuminator to activating the second illuminator or from activating the second illuminator to activating the first illuminator responsive to detecting a changing condition.

Embodiment 11. The code reader of embodiment 10, wherein the switch operation occurs over a plurality of frames following the changing condition.

Embodiment 12. The code reader of embodiment 10, wherein the switch operation occurs over a next frame following the changing condition.

Embodiment 13. The code reader of any of embodiments 10 through 12, wherein the switch operation includes the processor gradually fading out one illuminator while fading in the other illuminator.

Embodiment 14. The code reader of embodiment 13, wherein the processor gradually fades the illuminators by gradually mixing active illuminators with a changing duty cycle.

Embodiment 15. A method comprising: activating a first imager and a first illuminator as a receiver pair of an optical code reader responsive to detecting a first condition; activating a second imager and a second illuminator as a receiver pair of the optical code reader responsive to detecting a second condition, wherein: the first imager and the second imager have different fields of view; the first illuminator and the second illuminator project a different pattern substantially matching the corresponding field of view for its receiver pair; and selecting the first imager and the first illuminator pair for activation is responsive to one or more of a target distance of an object within its field of views or analysis of images captured by the first imager or the second imager; and decoding an optical code using an image captured by the selected receiver pair.

Embodiment 16. The method of embodiment 15, further comprising: determining the target distance of the object; selecting the first imager and the first illuminator pair for activation responsive to the target distance being less than a near threshold; and selecting the second imager and the second illuminator pair for activation responsive to the target distance being greater than a far threshold.

Embodiment 17. The method of embodiment 16, wherein if the target distance is between the near threshold and the far threshold, the method further comprises: capturing a first image with the first imager and determining a code resolution for the code identified in the first image; capturing a second image with the second imager and determining a code size for the code identified in the second image; and selecting either the first imager and the first illuminator pair or the second imager and the second illuminator pair for activation based, at least in part, on the code resolution determined from the first image and the code size determined from the second image.

Embodiment 18. The method of embodiment 17, wherein the code resolution is determined by calculating a pixel per module (PPM) value for the first image.

Embodiment 19. The method of embodiment 17 or embodiment 18, wherein the code size is determined from determining a bounding box surrounding the code identified in the second image.

Embodiment 20. The method of embodiment 19, wherein selecting includes: selecting the first imager and the first illuminator pair responsive to the calculated PPM value being less than a maximum PPM threshold for the first imager and the code size being greater than a field of view size for the second imager; and selecting the second imager and the second illuminator pair responsive to the calculated PPM value being greater than a maximum PPM threshold for the first imager and the code size being less than a field of view size for the second imager.

Embodiment 21. The method of any of embodiments 16 through 20, further comprising: comparing the target distance with a middle threshold in between the near threshold and the far threshold; selecting the first illuminator for activation with both the first imager and the second imager responsive to the target distance being less than the middle threshold; and selecting the second illuminator for activation with both the first imager and the second imager responsive to the target distance being greater than the middle threshold.

Embodiment 22. The method of any of embodiments 17 through 20, further comprising: comparing the target distance with a middle threshold in between the near threshold and the far threshold; selecting the first illuminator for activation with both the first imager and the second imager responsive to the target distance being less than the middle threshold; and selecting the second illuminator for activation with both the first imager and the second imager responsive to the target distance being greater than the middle threshold, wherein comparing the target distance with the middle threshold only occurs when insufficient code information is determined for at least one of the code resolution or the code size.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A code reader, comprising:
a first imager and a second imager configured to capture an image with different field of views, wherein the first imager has a near FOV and the second imager has a far FOV;
a first illuminator and a second illuminator each configured to project a different illumination pattern visible to a user;
a processor operably coupled to the imagers and the illuminators, the processor configured to:
determine a target distance for an object from the code reader;
activate the first imager and the first illuminator as a receiver pair with the second illuminator not active, responsive to detecting the target distance being less than a first distance threshold indicative of the object being in a near field;
activate the second imager and the second illuminator as a receiver pair with the first illuminator not active, responsive to detecting the target distance being greater than a second distance threshold indicative of the object being in a far field, wherein the first illuminator and the second illuminator project a different pattern substantially matching dimensions of the corresponding field of view for its receiver pair such that the respective illumination pattern that is visually presented to the user changes its shape depending on which imager is selected as the active imager; and
decode an optical code using an image captured by the selected receiver pair.

2. The code reader of claim 1, wherein selection of the first imager and first illuminator or the second imager and second illuminator as the receiver pair to be activated is further based, at least in part, on a determination of code size of an optical code on the object responsive to determining the target distance to be between the first distance threshold and the second distance threshold.

3. The code reader of claim 1, wherein the target distance is determined based on at least one of a time of flight measurement, laser triangulation, or passive focus run with best contrast evaluation.

4. The code reader of claim 1, wherein selection of the first imager and first illuminator or the second imager and second illuminator as the receiver pair to be activated is further based, at least in part, on a determination of a code resolution of an optical code of the object responsive to determining the target distance to be between the first distance threshold and the second distance threshold.

5. The code reader of claim 1, wherein the code reader is incorporated within one of a handheld scanner, a presentation scanner, a scan engine, a fixed scanner, a top down reader associated with a fixed scanner, a mobile computer, a point of sale system, a vision system, a robotic system, an automated driving system, or a machine vision system.

6. The code reader of claim 1, wherein the processor is configured to perform a switch operation from activating the first illuminator to activating the second illuminator or from activating the second illuminator to activating the first illuminator responsive to detecting a changing condition.

7. The code reader of claim 6, wherein the switch operation occurs over a plurality of frames following detection of the changing condition.

8. The code reader of claim 6, wherein the switch operation occurs over a next frame following detection of the changing condition.

9. The code reader of claim 6, wherein the switch operation includes the processor gradually fading out one illuminator while fading in the other illuminator.

10. The code reader of claim 9, wherein the processor gradually fades the illuminators by gradually mixing active illuminators with a changing duty cycle.

11. The code reader of claim 1, wherein the patterns for each of the first illuminator and the second illuminator have a rectangular shape with sharp edges that are different in dimensions.

12. A method of operating a code reader, the method comprising:
determining a target distance of an object;
selecting and activating a first imager and a first illuminator as a receiver pair of an optical code reader with a second illuminator not active, responsive to the target distance being less than a first distance threshold indicative of the object being in a near field of the code reader;
selecting and activating a second imager and a second illuminator as a receiver pair of the optical code reader with the first illuminator not active, responsive to the target distance being greater than a second distance threshold indicative of the object being in a far field of the code reader, wherein the first imager has a near field of view and the second imager has a far field of view, wherein the first illuminator and the second illuminator project a different pattern visible to a user and that has substantially matching dimensions of the corresponding field of view for its receiver pair, such that the respective illumination pattern that is visually presented to the user changes its shape depending on which imager is selected as the active imager; and
decoding an optical code using an image captured by the selected receiver pair.

13. The method of claim 12, wherein if the target distance is between the first distance threshold and the second distance threshold, the method further comprises:
capturing a first image with the first imager and determining a code resolution for the code identified in the first image;
capturing a second image with the second imager and determining a code size for the code identified in the second image; and
selecting either the first imager and the first illuminator pair or the second imager and the second illuminator pair for activation based, at least in part, on analysis of both the code resolution as determined from the first image and the code size as determined from the second image.

14. The method of claim 13, wherein the code resolution is determined by calculating a pixel per module (PPM) value for the first image.

15. The method of claim 14, wherein the code size is determined from determining a bounding box surrounding the code identified in the second image.

16. The method of claim 15, wherein selecting includes:
selecting the first imager and the first illuminator pair responsive to the calculated PPM value being less than a maximum PPM threshold for the first imager and the code size being greater than a field of view size for the second imager; and
selecting the second imager and the second illuminator pair responsive to the calculated PPM value being greater than a maximum PPM threshold for the first imager and the code size being less than a field of view size for the second imager.

17. The method of claim 13, further comprising:
comparing the target distance with a third distance threshold in between the first distance threshold and the second distance threshold;
selecting the first illuminator for activation with both the first imager and the second imager responsive to the target distance being less than the third distance threshold; and
selecting the second illuminator for activation with both the first imager and the second imager responsive to the target distance being greater than the third distance threshold.

18. The method of claim 17,
wherein comparing the target distance with the third distance threshold only occurs when insufficient code information is determined for at least one of the code resolution or the code size.

19. The method of claim 17, further comprising sending images from each the first imager and the second imager to a decoder for decoding during a time in which they are both activated with the first illuminator.

20. The method of claim 17, further comprising sending images from each the first imager and the second imager to a decoder for decoding during a time in which they are both activated with the second illuminator.

* * * * *